UNITED STATES PATENT OFFICE.

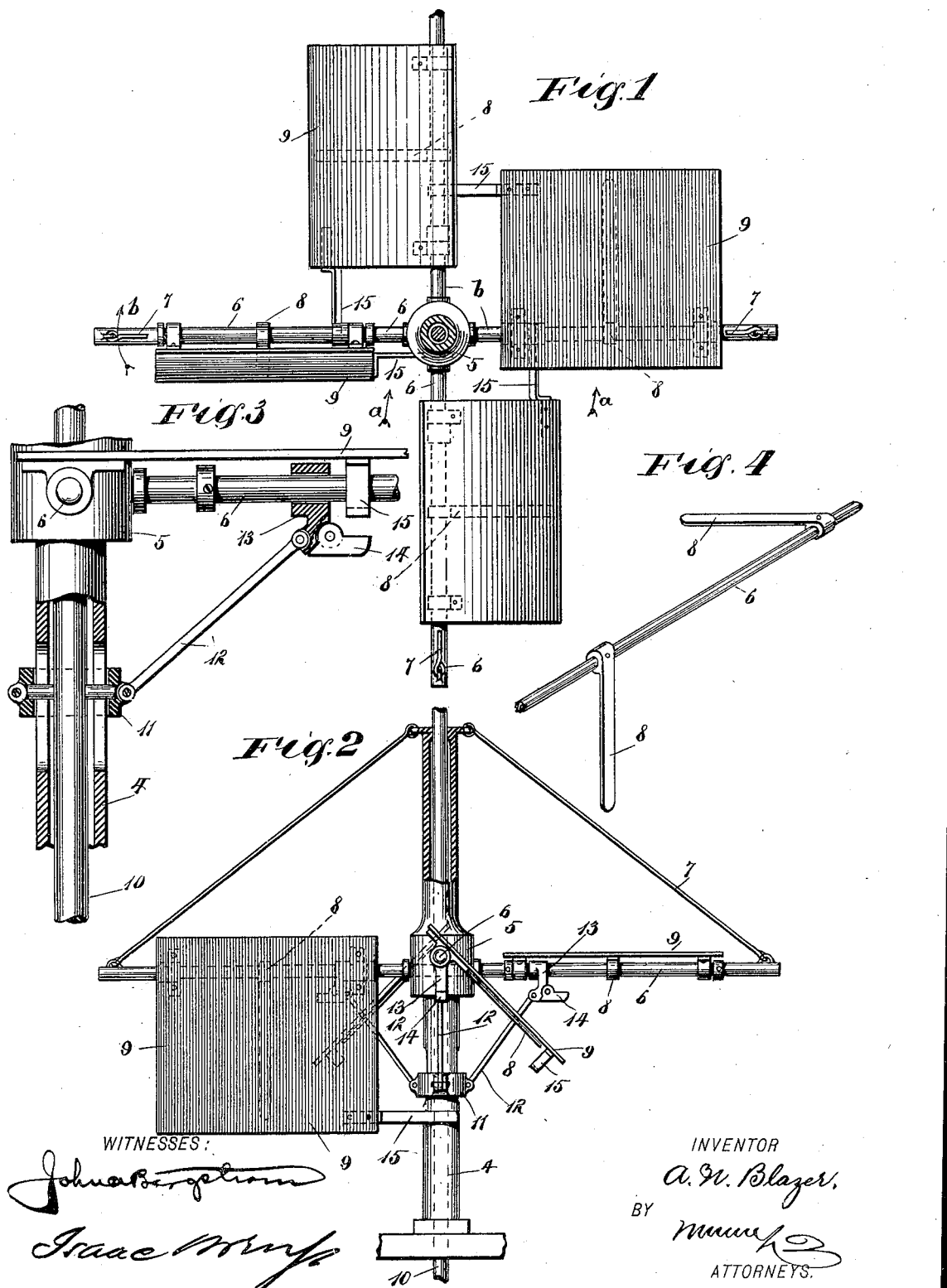

ALMER N. BLAZER, OF MESCALERO, TERRITORY OF NEW MEXICO, ASSIGNOR OF ONE-HALF TO FRANK I. OTIS, OF SAME PLACE.

POWER-WHEEL.

SPECIFICATION forming part of Letters Patent No. 611,098, dated September 20, 1898.

Application filed June 5, 1897. Serial No. 639,582. (No model.)

*To all whom it may concern:*

Be it known that I, ALMER N. BLAZER, of Mescalero, in the county of Donna Ana and Territory of New Mexico, have invented a new and Improved Power-Wheel, of which the following is a full, clear, and exact description.

This invention is a power-wheel adapted for use in connection with fluids, such as water and air, and the apparatus is characterized by a plurality of feathering-blades designed to be acted upon by the fluid-current, whereby to turn a central shaft on which the blades are carried.

This specification is the disclosure of one form of my invention, while the claims define the actual scope of the conception.

Reference is to be had to the accompanying drawings, forming a part of this specification, in which similar characters of reference indicate corresponding parts in all the figures.

Figure 1 is a plan view of the invention, partly in section. Fig. 2 is a side elevation thereof, also partly in section. Fig. 3 is an enlarged fragmentary side elevation of the hub and the coacting shaft and one of the blades. Fig. 4 is a fragmentary perspective of one of the shafts which carry the blades.

On a suitable support 3 (shown in Fig. 2) a hollow shaft 4 is revolubly mounted, and fixed to the hollow shaft 4 is a hub 5, carrying two crossed shafts 6, extending at right angles to each other and braced at their outer ends by means of guy-rods 7, extending to the shaft 4. Fixed on the end portion of each shaft 6 is an arm 8, the arms being four in number, two for each shaft. Mounted to turn loosely on each shaft 6 are two blades 9, arranged one at each end of the shaft 6 and limited in their downward movement by the arms 8, which hold the blades when active in a slightly downwardly-inclined position, as illustrated best in Figs. 1 and 2. The blades 9 are eccentrically mounted on the shafts 6.

Slidable through the hollow shaft 4 is a rod 10, connected to a collar 11, that slides on the exterior of the shaft 4. Attached to the collar 11 are four rods 12, respectively attached to fingers 13. The fingers 13 are four in number and slide two on each shaft 6, and each finger 13 has a free portion 14, connected to the main portion by means of a knuckle-joint. Fixed to each blade 9 is an angular arm 15, the arm 15 of each blade being designed to engage with the coacting finger 13, whereby the blades 9 may be held upward in horizontal position and therefore at rest. This holding of the blades 9 in upward position can only be effected when the rod 10 is drawn upward through the shaft 4, whereby to throw outward the fingers 13 and cause the arms 15 to strike the free portions 14 of the finger, when the arms are raised by the action of the current. As the arms 15 strike the free portions 14 of the fingers 13 said free portions will yield upward to permit the arms to engage with the upper portions of the fingers whereby to hold the arms in such position and to maintain the blades 9 in locked position. The blades are released by pressing the rod 10 downward, whereupon the fingers 13 will be moved inward and disengage with the arms 15.

It will be seen that the arms 8 of each shaft are disposed at an angle to each other, so that when one of the blades 9 is thrown down to approximately a vertical position and is receiving the action of the wind the other blade of the same shaft is raised to horizontal position and is held raised by the action of the arm 8 beneath it. The arms 15 strike against the lower portion of the shaft 4, as shown at the right of Figs. 1 and 2, and by these means the blades are prevented from swinging past their vertical or active position. This is the action of the parts during the time that the windmill is operating, at which time the shafts 6 turn with the hollow shaft 4 and the blades 9 successively drop into vertical or active position.

When the apparatus is operating, the current of air flowing in the direction indicated by the arrows *a* will engage the blade at the left hand of Fig. 1 and turn the wheel in the direction of the arrow *b* in Fig. 1. The blade at the right of Fig. 1 will assume a horizontal position, so as to lie evenly edgewise with the current. Fig. 2 shows the parts operating in the same way. In Fig. 2 the right-hand blade is raised horizontally and the left-hand blade is inclined downward to receive the action of the current. As the wheel turns the blades alternately rise and fall to disengage and then to engage the current, so as to turn the wheel continuously in one direction. The normal positions of the parts 10, 11, and 13 are with the shaft lowered and the fingers drawn inward. Should it be desired to suspend altogether the action of the wheel, the rod 10 is raised upward to throw outward the fingers 13, whereupon the blades 9 as they rise at the left-hand side of the wheel will engage their arms 15 with the corresponding free portions 14 of the fingers, and as this operation takes place the blades 9 will be held suspended. To put the machine into operation again the rod 10 is lowered, whereupon the fingers 13 are drawn inward.

Various changes in the form, proportion, and minor details of my invention may be resorted to without departing from the spirit and scope thereof—as, for example, I may in practice support the device from above and dispense with the bearings 3. Hence I do not consider myself limited to the precise construction herein shown, but believe that I am entitled to all such variations as come within the terms of my claims.

Having thus described my invention, I claim as new and desire to secure by Letters Patent—

1. The combination of a hollow shaft, two angularly-disposed shafts carried horizontally by the hollow shaft, two blades pivoted to each shaft, an arm adjacent to each blade, the arms being fixed to the shafts and serving to limit the movement of the blades, an arm carried by each blade, a finger sliding on each of said angularly-disposed shafts, and means for moving the fingers in and out to engage and disengage the respective arms on the blades.

2. The combination of a hollow shaft, a rod sliding through the hollow shaft, a collar sliding on the hollow shaft and connected with the rod, two angularly-disposed shafts carried horizontally on the hollow shaft, a finger sliding on each of said angularly-disposed shafts and connected with the collar, a blade pivoted to the outer portion of each angularly-disposed shaft, an arm carried by each blade and respectively coacting with the fingers and an arm fixed to said outer portions of each of said shafts and serving to limit the movements of the blades.

3. The combination of a shaft, a blade pivoted to the shaft, a sliding finger capable of engaging with the blade and means for supporting the finger to hold the blade.

4. The combination of a shaft, a blade pivoted on the shaft, an arm fixed to the shaft and limiting the movement of the blade, an arm fixed to the blade, and a sliding finger capable of being engaged by the arm on the blade, whereby to hold the blade raised.

ALMER N. BLAZER.

Witnesses:
 ADAM J. DIETER,
 LUIS VIGIL.